United States Patent
Zeng et al.

(10) Patent No.: US 9,817,172 B2
(45) Date of Patent: Nov. 14, 2017

(54) BACKLIGHT MODULE AND LIQUID CRYSTAL DISPLAY DEVICE

(71) Applicant: Wuhan China Star Optoelectronics Technology Co., Ltd., Wuhan, Hubei (CN)

(72) Inventors: Jie Zeng, Guangdong (CN); Yanxue Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 204 days.

(21) Appl. No.: 14/762,597

(22) PCT Filed: May 13, 2015

(86) PCT No.: PCT/CN2015/078880
§ 371 (c)(1),
(2) Date: Jul. 22, 2015

(87) PCT Pub. No.: WO2016/169072
PCT Pub. Date: Oct. 27, 2016

(65) Prior Publication Data
US 2017/0146717 A1    May 25, 2017

(30) Foreign Application Priority Data

Apr. 22, 2015   (CN) .......................... 2015 1 0193525

(51) Int. Cl.
*F21V 7/04*      (2006.01)
*F21V 8/00*      (2006.01)

(52) U.S. Cl.
CPC .......... *G02B 6/0026* (2013.01); *G02B 6/002* (2013.01); *G02B 6/009* (2013.01)

(58) Field of Classification Search
USPC .................................................. 362/611–634
See application file for complete search history.

(56) References Cited

U.S. PATENT DOCUMENTS

2007/0217226 A1*  9/2007  Zhu ........................ G02B 6/002
                                                               362/615
2010/0302801 A1* 12/2010  Lin ...................... G02B 6/0018
                                                               362/606

* cited by examiner

*Primary Examiner* — Matthew Mikels
(74) *Attorney, Agent, or Firm* — Andrew C. Cheng

(57) ABSTRACT

The disclosure is related to a backlight module comprising a light guide plate, a light source assembly and a frame. The frame surrounds the light guide plate. The light source assembly is arranged between the light incident surface of the light guide plate and the frame. The light source assembly comprises a substrate, a light emitting body and a transparent body. The transparent body packages the light emitting body on the substrate. The outer surface of the transparent body facing the light emitting body is a light emitting surface having a groove formed thereon facing the light incident surface of the light guide plate. The groove enables the light emitted from the transparent body to congest toward the direction of the center of the light guide plate to increase the optical coupling efficient of the backlight module. The disclosure further provides a liquid crystal display device.

16 Claims, 3 Drawing Sheets

BACKLIGHT MODULE AND LIQUID CRYSTAL DISPLAY DEVICE

CROSS REFERENCE TO RELATED APPLICATION

This invention claims priority under 35 U.S.C. 119 from China Application No. 201510193525.6, titled "Backlight Module and Liquid Crystal Display Device", filed Apr. 22, 2015, the entire contents of which are incorporated herein by reference in its entirety.

BACKGROUND

Technical Field

The disclosure is related to the technology field of the liquid crystal display, and more particular to a backlight module and a liquid crystal display device.

Related Art

LCD industry is moving towards a more efficient, more environmentally friendly, more energy-efficient direction. With the gradual improvement of LCD technology, to ensure good quality, how to improve the optical coupling efficiency of the backlight module of the liquid crystal display device, thereby reducing energy consumption has become the main direction of the entire industry research.

SUMMARY

The disclosure provides a backlight module and a liquid crystal display device, having good optical coupling efficiency.

In order to achieve the above purpose, the embodiments of the disclosure provide the technical solutions as below.

In one aspect, the disclosure provides a backlight module comprising a light guide plate; a frame surrounding the light guide plate; and a light source assembly arranged between the light incident surface of the light guide plate and the frame, the light source assembly comprising a substrate, a light emitting body, and a transparent body packaging the light emitting body on the substrate; wherein the outer surface of the transparent body facing the light emitting body is a light exiting surface, the light exiting surface having a groove formed thereon facing the light incident surface of the light guide plate.

In one embodiment, the light source assembly comprises a central section passing through the central axial of the light emitting body and the light emitting surface; on the central section, the groove comprises a V-shaped structure.

In one embodiment, the V-shaped structure comprises a first edge and a second edge; an angle is formed between the first edge and the second edge; the angle faces the light guide plate; the angel is between 90 degree and 120 degree.

In one embodiment, the light source assembly comprises a central section passing through the central axial of the light emitting body and the light emitting surface; on the central section, the groove comprises an arc-shaped structure.

In one embodiment, the light source assembly comprises a central section passing through the central axial of the light emitting body and the light exiting surface; on the central section, the groove comprises a trapezoid structure; the opening of the groove is the top edge of the trapezoid structure, and the bottom edge of the groove is the bottom edge of the trapezoid structure; the pair of the side edges of the trapezoid structure is used to congest the light emitted from the light emitting body to the center of the light guide plate.

In one embodiment, the transparent body comprises a pair of limiting portions arranged at the two sides of the light exiting surface; the pair of limiting portions match with the top surface and the bottom surface of the light guide plate to limit the light incident surface of the light guide plate between the limiting portions.

In one embodiment, the match between the limiting portions and the light guide plate is seamless tight match.

In one embodiment, the transparent body further comprises a light-shielding layer arranged on the surface that the limiting portion matches with the light guide plate.

In one embodiment, the material of the transparent body is a resin containing a phosphor.

In another aspect, the disclosure provides a liquid crystal display device comprising any one of the backlight modules as mentioned above.

In the backlight module and the liquid crystal display device of the disclosure, the groove is arranged on the light emitting surface of the transparent body of the light source assembly. The groove faces the light incident surface of the light guide plate. The groove enables the light emitted from the light emitting body to congest toward the direction of the center of the light guide plate to increase the optical coupling efficiency of the back light module.

BRIEF DESCRIPTION OF THE DRAWINGS

In order to more clearly illustrate the embodiments the disclosure, the accompanying drawings for illustrating the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

The following description with reference to the accompanying drawings is provided to clearly and thoroughly explain the exemplary embodiments of the disclosure.

Figure 1:
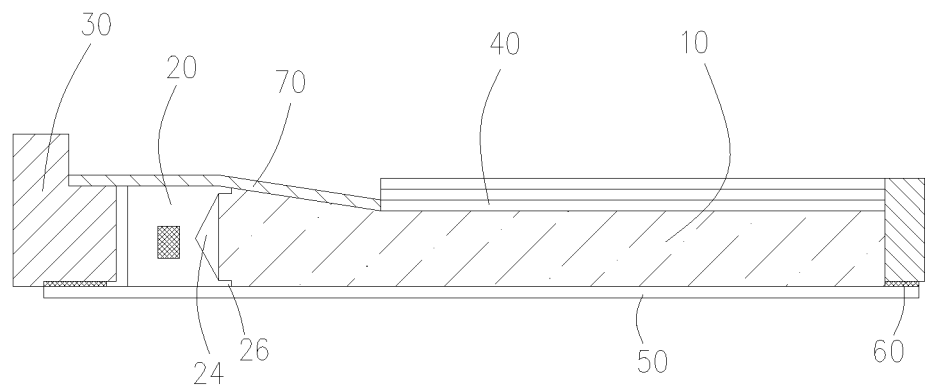
FIG. 1 is the schematic diagram of the backlight module according to one embodiment of the disclosure.

Refer to FIG. 1. The backlight module of the disclosure comprises a light guide plate 10, a light source assembly 10 and a frame 30. The frame 30 surrounds the light guide plate 10.

The light source assembly 20 is arranged between the light incident surface of the light guide plate 10 and the frame 30. The backlight module further comprises a multi-layered optical film 40 and a reflective sheet 50. The reflective sheet 50 is arranged the bottom surface of the light guide plate 10. The multi-layered optical film 40 is arranged at the top surface of the light guide plate 10, and is stacked. The optical film 40 covers a portion of the top surface of the light guide plate 10. The frame 30 is fixed at the periphery of the reflective sheet 50 by a double-sided adhesive 60. The backlight module further comprises a flexible circuit board 70. One portion of the flexible circuit board is arranged at a region that is not covered by the optical film 40 on the top surface of the light guide plate 10. The other portion of the flexible portion 70 connects to the light source assembly 20 and the frame 30. The light guide plate 10, the light source assembly 20 and the frame 30 are fixed together through the flexible circuit board 70.

Figure 2:
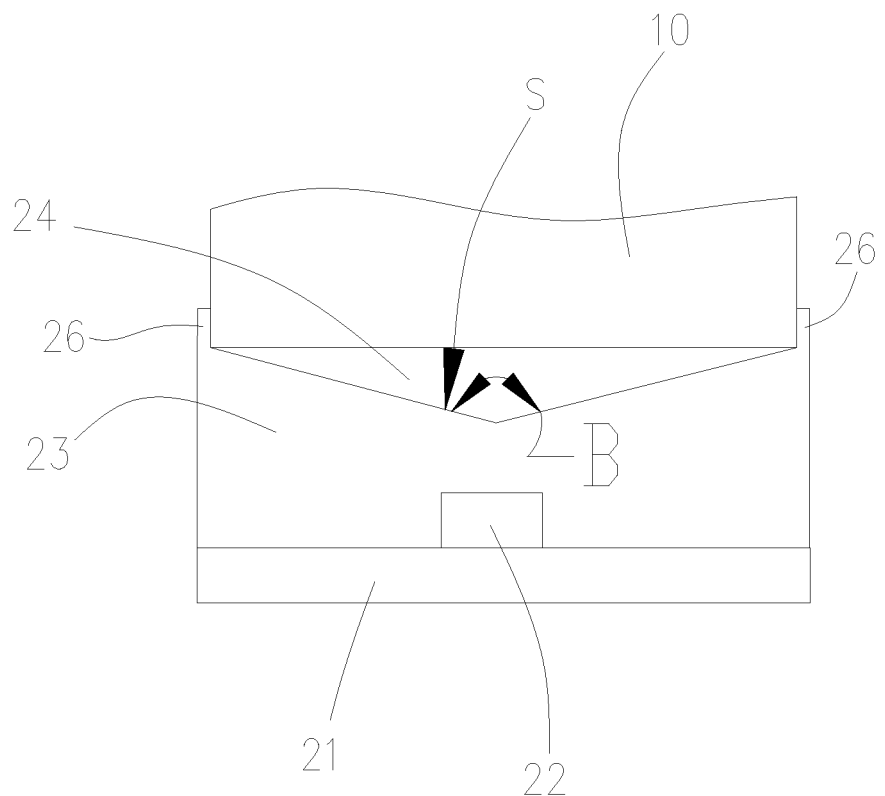
FIG. 2 is the schematic diagram of the light source assembly of the backlight module according to the first embodiment of the disclosure.
Figure 3:
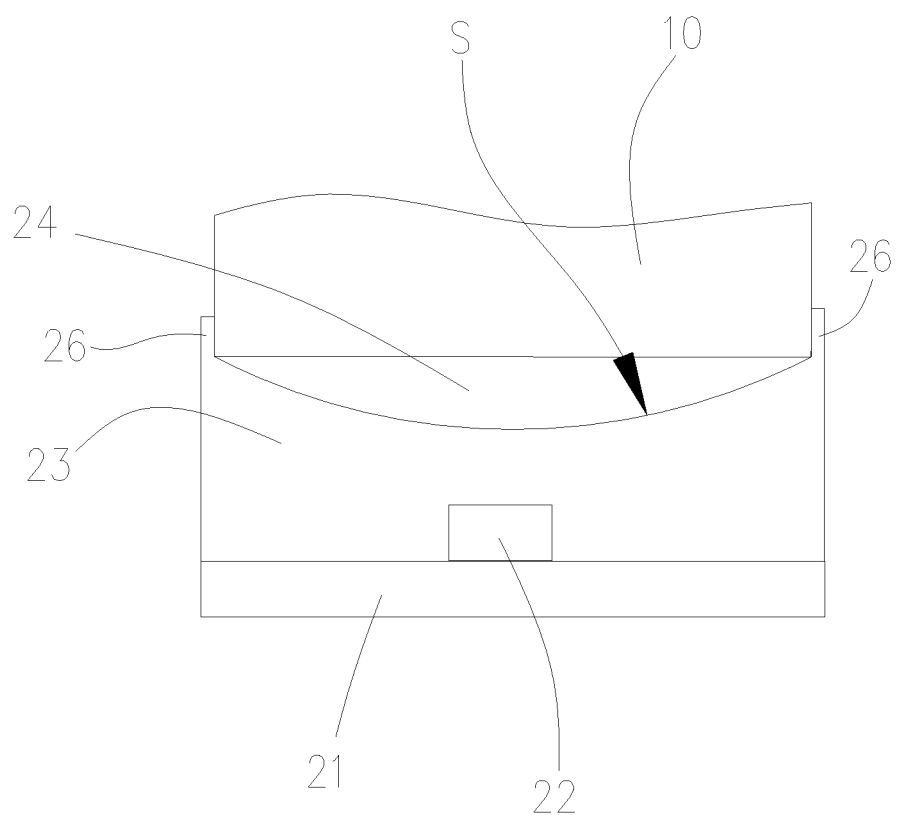
FIG. 3 is the schematic diagram of the light source assembly of the backlight module according to the second embodiment of the disclosure.
Figure 4:
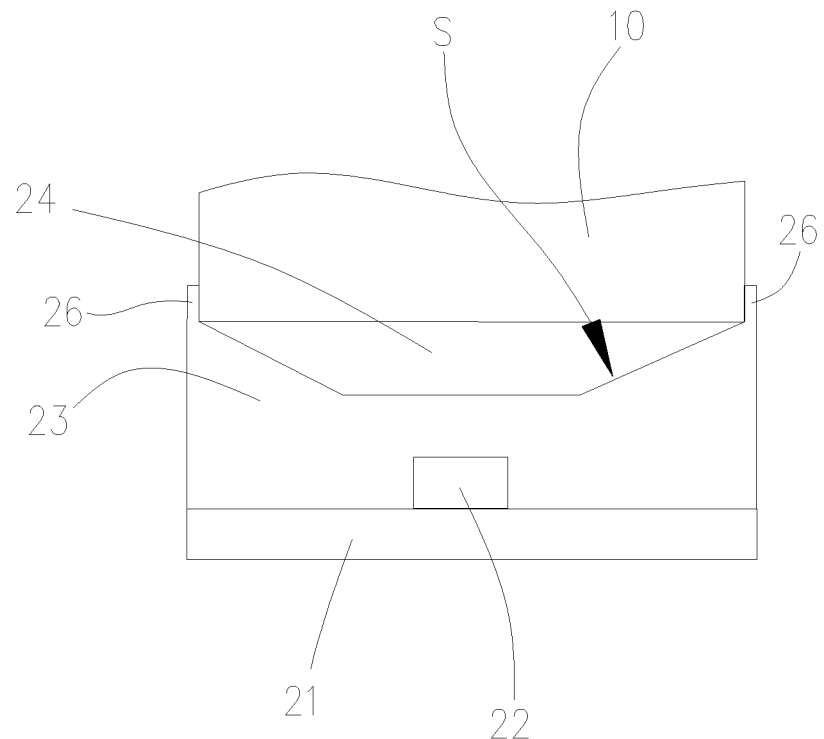
FIG. 4 is the schematic diagram of the light source assembly of the backlight module according to the third embodiment of the disclosure.

Refer to FIG. 2, FIG. 3 and FIG. 4. The light source assembly 20 comprises a substrate 21, a light emitting body 22, and a transparent body 23. The transparent body 23 packages the light emitting body 22 on the substrate 21. The outer surface of the transparent body 23 facing the light emitting body 22 is a light emitting surface. The light emitting surface is arranged with a groove 24 formed thereon facing the light incident surface of the light guide plate 10. The groove 24 enables the light emitted from the light emitting body 22 to congest toward the direction of the center of the light guide plate 10 to increase the optical coupling efficiency of the light guide plate.

Figure 5:
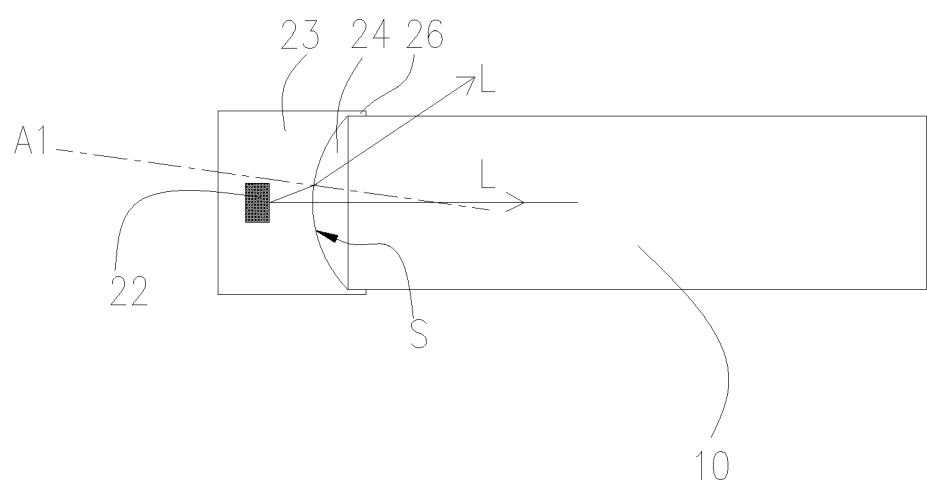
FIG. 5 is the light path of the light source assembly of the disclosure.

FIG. 5 is the light path of the light source assembly 20. The light L (denoted by the line L with an arrow) emitted from the light emitting body 22 transmits in the transparent body 23.

When the light L encounters the light emitting surface S, the light L refracts. Due to the existence of the groove 24, the normal line A1 that the light L refracts is more inclined than the surface of the light guide plate 10. The normal line A1 that the light L refracts results in the aggregation of the light L toward the direction of the center of the light guide plate 10 to increase the optical coupling efficiency of the backlight module.

The design of the groove 24 on the light exiting surface S of the light source assembly 20 of the disclosure may be but not limited to a V-shaped structure, an arc-shaped structure, a trapezoid structure and etc. The specific details are described as below.

FIG. 2 is the first embodiment of the light source assembly 20. The light source assembly 20 comprises a central section passing through the central axial of the light emitting body 22 and the light emitting surface S; on the central section, the groove 24 comprises a V-shaped structure. The V-shaped structure comprises a first edge and a second edge. An angle B is formed between the first edge and the second edge. The angle B faces the light guide plate 10. The angel is between 90 degree and 120 degree.

FIG. 3 is the second embodiment of the light source assembly 20. The light source assembly comprises a central section passing through the central axial of the light emitting body 22 and the light emitting surface. On the central section, the groove 24 comprises an arc-shaped structure.

FIG. 4 is the third embodiment of the light source assembly 20. The light source assembly 20 comprises a central section passing through the central axial of the light emitting body 22 and the light emitting surface. On the central section, the groove 24 comprises a trapezoid structure. The opening of the groove 24 is the top edge of the trapezoid structure, and the bottom edge of the groove 24 is the bottom edge of the trapezoid structure. The pair of the side edges of the trapezoid structure is used to congest the light emitted from the light emitting body to the center of the light guide plate 10.

In one embodiment, the transparent body 23 comprises a pair of limiting portions 26 arranged at the two sides of the light emitting surface S. The pair of limiting portions 26 respectively matches with the top surface and the bottom surface of the light guide plate 10 to limit the light incident surface of the light guide plate 10 between the limiting portions 26. Such configuration enables tight fit the light incident surface of the light guide plate 10 and the light source assembly 20 to fit tightly to prevent or reduce the light leakage at the junction between the light guide plate 10 and the light source assembly 20. The optical transmission efficiency of the backlight module is further enhanced. During the assembly, the positioning function of the light guide plate 10 is also added.

The match between the limiting portions 26 and the light guide plate 10 is seamless tight match. The limiting portions 26 can be elastically deformed to grip the light guide plate 10.

In one embodiment, the transparent body 23 further comprises a light-shielding layer (not shown) arranged on the surface that the limiting portion 26 matches with the light guide plate 10. The structure of the limiting portion 26 may further facilitate prevent or reduce the light leakage at the junction between the light guide plate 10 and the light source assembly 20.

The material of the transparent body 23 is a resin containing a phosphor.

The disclosure further provides a liquid crystal display device. The liquid crystal display device comprises the backlight module as mentioned above.

In the backlight module and the liquid crystal display device of the disclosure, the groove 24 is arranged on the light emitting surface of the transparent body 23 of the light source assembly 20. The groove 24 faces the light incident surface of the light guide plate 10. The groove 24 enables the light emitted from the light emitting body 22 to congest toward the direction of the center of the light guide plate 10 to increase the optical coupling efficiency of the back light module.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A backlight module comprising:
a light guide plate;
a frame surrounding the light guide plate; and
a light source assembly arranged between the light incident surface of the light guide plate and the frame, the light source assembly comprising a substrate, a light emitting body, and a transparent body packaging the light emitting body on the substrate;
wherein the outer surface of the transparent body facing the light emitting body is a light exiting surface, the light exiting surface having a groove formed thereon facing the light incident surface of the light guide plate;
wherein the transparent body comprises a pair of limiting portions arranged at the two sides of the light exiting surface; the pair of limiting portions match with the top surface and the bottom surface of the light guide plate to limit the light incident surface of the light guide plate between the limiting portions.

2. The backlight module according to claim 1, wherein the light source assembly comprises a central section passing through the central axial of the light emitting body and the light emitting surface; on the central section, the groove comprises a V-shaped structure.

3. The backlight module according to claim 2, wherein the V-shaped structure comprises a first edge and a second edge; an angle is formed between the first edge and the second edge; the angle faces the light guide plate; the angel is between 90 degree and 120 degree.

4. The backlight module according to claim 1, wherein the light source assembly comprises a central section passing through the central axial of the light emitting body and the light emitting surface; on the central section, the groove comprises an arc-shaped structure.

5. The backlight module according to claim 1, wherein the light source assembly comprises a central section passing through the central axial of the light emitting body and the light exiting surface; on the central section, the groove comprises a trapezoid structure; the opening of the groove is the top edge of the trapezoid structure, and the bottom edge of the groove is the bottom edge of the trapezoid structure; the pair of the side edges of the trapezoid structure is used to congest the light emitted from the light emitting body to the center of the light guide plate.

6. The backlight module according to claim 1, wherein the match between the limiting portions and the light guide plate is seamless tight match.

7. The backlight module according to claim 1, wherein the transparent body further comprises a light-shielding layer arranged on the surface that the limiting portion matches with the light guide plate.

8. The backlight module according to claim 1, wherein the material of the transparent body is a resin containing a phosphor.

9. A liquid crystal display device comprising a backlight module, the backlight module comprising:
   a light guide plate;
   a frame surrounding the light guide plate; and
   a light source assembly arranged between the light incident surface of the light guide plate and the frame, the light source assembly comprising a substrate, a light emitting body, and a transparent body packaging the light emitting body on the substrate;
   wherein the outer surface of the transparent body facing the light emitting body is a light exiting surface, the light exiting surface having a groove formed thereon facing the light incident surface of the light guide plate;
   wherein the transparent body comprises a pair of limiting portions arranged at the two sides of the light exiting surface; the pair of limiting portions match with the top surface and the bottom surface of the light guide plate to limit the light incident surface of the light guide plate between the limiting portions.

10. The liquid crystal display according to claim 9, wherein the light source assembly comprises a central section passing through the central axial of the light emitting body and the light emitting surface; on the central section, the groove comprises a V-shaped structure.

11. The liquid crystal display according to claim 10, wherein the V-shaped structure comprises a first edge and a second edge; an angle is formed between the first edge and the second edge; the angle faces the light guide plate; the angel is between 90 degree and 120 degree.

12. The liquid crystal display according to claim 9, wherein the light source assembly comprises a central section passing through the central axial of the light emitting body and the light emitting surface; on the central section, the groove comprises an arc-shaped structure.

13. The liquid crystal display according to claim 9, wherein the light source assembly comprises a central section passing through the central axial of the light emitting body and the light exiting surface; on the central section, the groove comprises a trapezoid structure; the opening of the groove is the top edge of the trapezoid structure, and the bottom edge of the groove is the bottom edge of the trapezoid structure; the pair of the side edges of the trapezoid structure is used to congest the light emitted from the light emitting body to the center of the light guide plate.

14. The liquid crystal display according to claim 9, wherein the match between the limiting portions and the light guide plate is seamless tight match.

15. The liquid crystal display according to claim 9, wherein the transparent body further comprises a light-shielding layer arranged on the surface that the limiting portion matches with the light guide plate.

16. The liquid crystal display according to claim 9, wherein the material of the transparent body is a resin containing a phosphor.

* * * * *